Sept. 29, 1931. J. P. MORLEY 1,825,326
WATER HEATER
Filed Feb. 10, 1928 2 Sheets-Sheet 1

Witness
Martin H. Olsen

Inventor
James P. Morley
By Rector, Hibben, Davis & Macauley
Attys

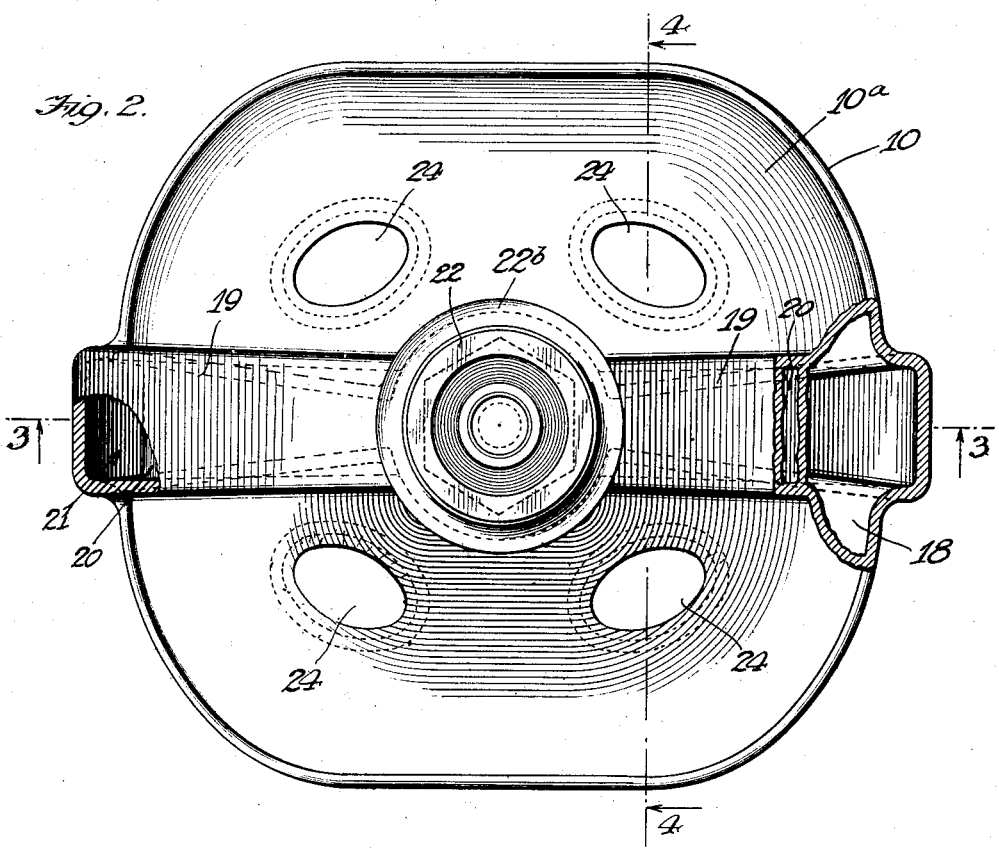
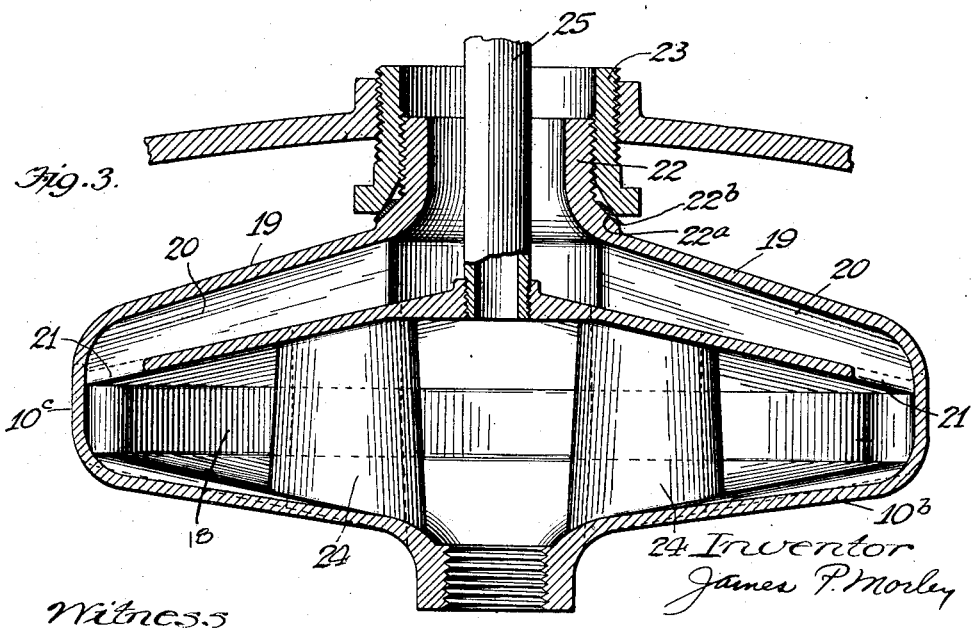

Patented Sept. 29, 1931

1,825,326

UNITED STATES PATENT OFFICE

JAMES P. MORLEY, OF MICHIGAN CITY, INDIANA, ASSIGNOR TO BASTIAN-MORLEY COMPANY, OF LA PORTE, INDIANA, A CORPORATION OF INDIANA

WATER HEATER

Application filed February 10, 1928. Serial No. 253,267.

My invention relates generally to water heaters for household and other uses, and it has to do more especially with a novel form of spreader which is associated with the storage tank in such a manner that water flows therethrough during its circulation, such spreader being subjected to heat from a burner therebeneath to heat the water therein and cause circulation of the same.

Practical demonstration has shown that there are certain conditions in the use of spreaders which may be improved upon. More specifically, the gases from the burner which strike the lower convex bottom of the spreader are hot and effectively heat the spreader surface and the water in contact therewith. These gases are directed upwardly around and over the spreader walls, in part, by the natural tendency of such gases to rise, and due to the shape of the spreader and its wall such gases are spread out upwardly against the bottom of the storage tank and eventually find their way to the usual flue passage through the storage tank. While these gases are originally hot, "live" and active gases, they may tend to spend and become exhausted, "dead" or inactive and cold gases as they reach some points against the bottom of the storage tank remote from the burner,—and as they enter and pass through the flue,—and at some remote points on the spreader. As these gases become inactive and cooled they are no longer effective for heating and may tend to collect at these remote points in the form of a cold film which insulates such surfaces from the outcoming hotter gases. Such cold film or films are in a more or less dormant condition and, in addition to insulating, tend to cool the oncoming hotter gases and further render them less effective. The gases which eventually exhaust through the flue tend to aid in the heating of the water, but this tendency is limted by the cold gas film which may collect on the flue walls and insulate the same from the hotter gases, and by the cooling action of the colder gases. A result of the foregoing is that the full benefit is not derived from the heat applied, and the percentage of fuel waste and the cost of operation are higher than desirable.

One of the objects of my invention is to remedy the foregoing conditions by the provision of means for applying hot gases directly from the burner to all points remote from the burner and for co-mingling such hot gases with the gases which may tend to cool in such a manner that all such gases are maintained as "live", active and effective gases.

Another object is to increase the efficiency of the heater as a whole, and to that end my invention, in part, provides additional heating surface internally of the spreader which acts on the water entering the spreader in such a manner that the rate of flow therethrough, toward and through the riser pipe is greatly increased. This tends to not only increase the circulation, but also the temperature rise.

A further object is to improve combustion. The gases of combustion are caused to move away from the combustion space beneath the spreader faster than previously, and the possibility of the accumulation of dead gases at that point is eliminated.

Other, and more specific, objects are to mix the hot and fully effective burner gases with the gases which tend to become cooler and to render them efficient to produce a uniform heating effect throughout the areas subjected to the heat of burner gases; to prevent the formation of exhausted and cold gas pockets as well as insulating films of the gases; to render all the gases passing through the heater flue active to apply a heating effect to the water in the tank; to provide for economy in fuel consumption; to increase the heat-rise on a single traverse of the water through the spreader; and to provide a simple and highly efficient spreader construction which may be made as a single casting and which may be readily and quickly installed in connection with new heaters or heaters already in use.

Other objects and advantages will become apparent as this description progresses and by reference to the drawings wherein,—

Fig. 2 is an enlarged top plan view, partially in section, of a spreader embodying my invention;

Fig. 3 is a vertical section through the central portion of the spreader of Fig. 2 and taken substantially on line 3—3 of that figure.

Figure 1:
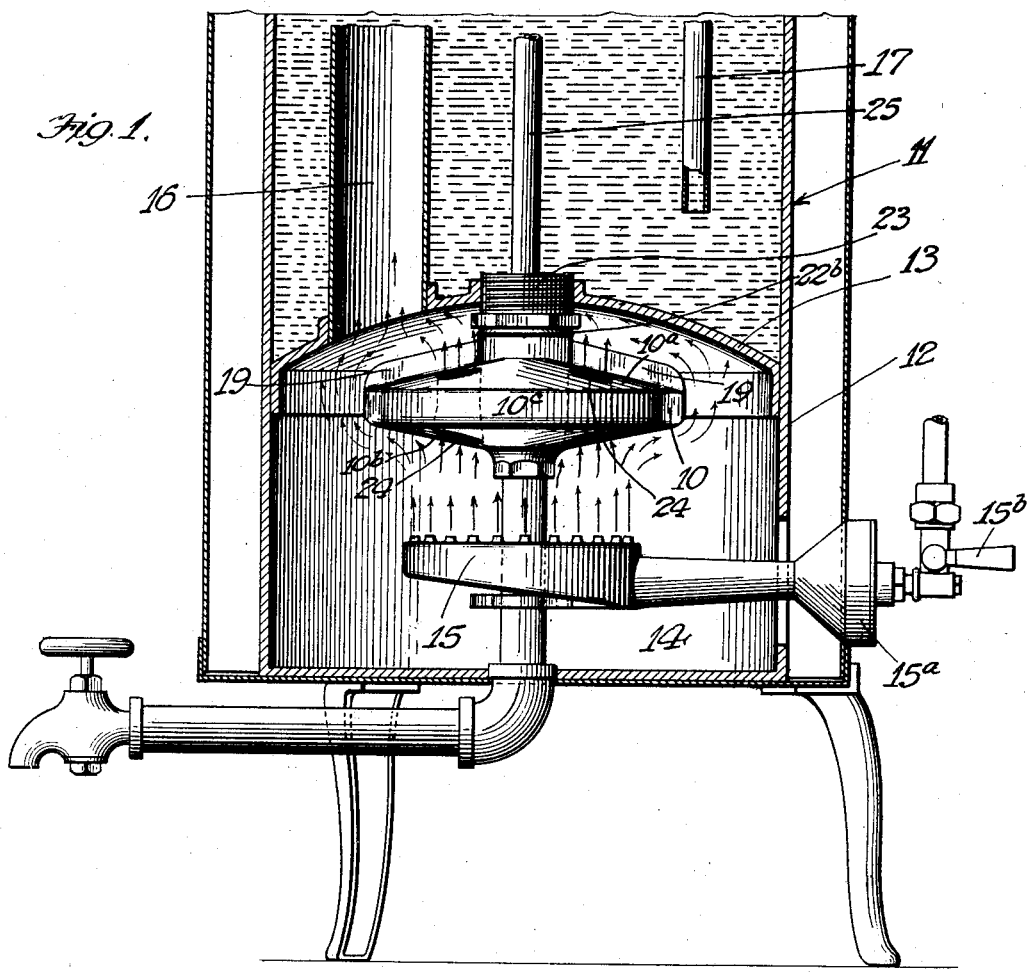
Figure 1 is a vertical sectional view through the lower portion of a water heater embodying my invention and diagrammatically illustrating by arrows the direction of movement of the burner gases.

In the drawings, and particularly Fig. 1, I have shown a spreader 10 embodying my invention and associated with a storage tank 11 having its wall 12 extended beneath the bottom 13 and enclosed to form a lower combustion chamber 14 which receives both the spreader 10 and the burner 15. This burner 15 may be of any desired form adapted to readily burn gas, oil, or other desirable fuel; however, the form which I have shown is adapted for the burning of gas and is associated with a mixture device 15ª and valve 15ᵇ adapted to control the flow of fuel from the source (not shown). While I have shown the burner controlled by manual means, it will be understood that it may be controlled by thermostatic means under the control of the temperature of the water in the storage tank 11, or otherwise, without departing from my invention.

The combustion chamber 14 is connected to a gas-discharge flue 16 which extends through the body of the water in the storage tank and is carried by the top and bottom walls of the latter in the usual manner. It will be noted that this flue 16 is offset with relation to the burner and spreader to permit the burner and spreader to be arranged concentrically within the combustion chamber to aid in more equal distribution of the burner gases. The spreader 10 is somewhat cylindrical in outline with convex top and bottom walls and the arrangement is such that the gases from the burner 15 strike the bottom of the spreader and are directed upwardly about its walls to be equally distributed thereover and over the area of the storage tank bottom, all of which add to the efficiency of the structure. Furthermore, the flue passing through the interior of the tank and carrying the exhaust gases contributes their heat to the water in the tank and further adds to the efficiency of the heater as a whole.

The top of the tank receives a cold water inlet pipe 17 which extends toward and near the bottom 13, and also the usual service or hot water pipe (not shown).

Figure 4:
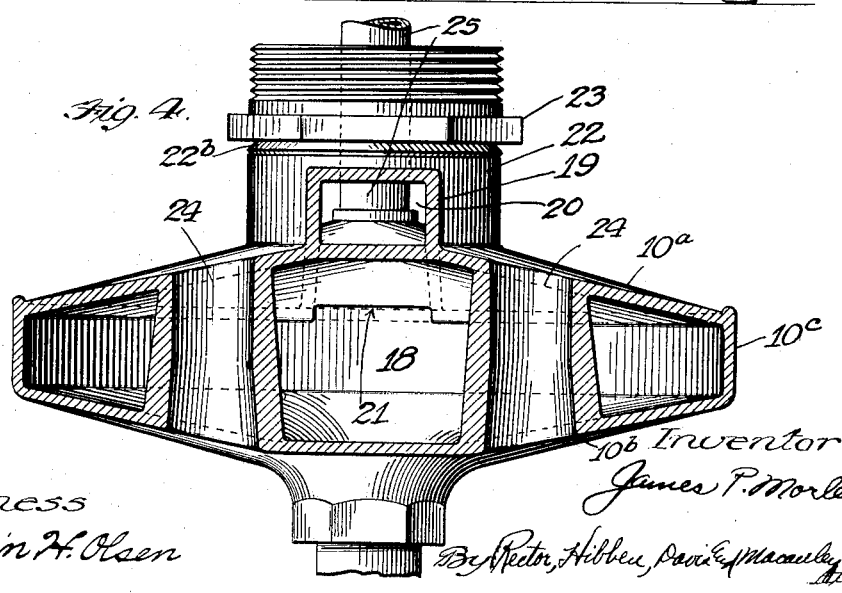
Fig. 4 is a transverse vertical section taken substantially on line 4—4 of Fig. 2.

As hereinabove explained, and with particular reference to Fig. 1, it has been found that the hot gases from the burner 15 may, in part, become cold and inactive by the time they reach some of the more remote parts of the tank bottom 13, the upper part of the spreader 10 and the flue 16. These gases form insulating films upon the surfaces at these remote points insulating such surfaces from the oncoming hotter gases, unless otherwise provided for. My invention takes care of such condition and renders all of the gases fully effective even at the most remote points and one form of construction which I employ to that end will now be described. The spreader (Figs. 3 and 4) convex top and bottom walls 10ª and 10ᵇ are integrally joined at their edges by a cylindrical and vertical wall 10ᶜ to provide a comparatively large water heating and circulating chamber 18 having its bottom wall downwardly directed and its top wall upwardly directed. Radial and opposed hollow ribs 19 are formed, preferably, integrally with and upon the top wall 10ª of the spreader providing cold water intake passages 20 above the upper wall in communication with the spreader chamber 18 at the outer edges thereof through openings 21.

The spreader is provided with an upper hollow and externally threaded neck 22 in communication with both the cold water passages 20 and adapted to be carried by a bushing 23 secured to the tank bottom 13 in a water-tight manner. It will be noted that the base of the threaded spreader neck 22 is provided with a seat 22ª adapted to receive a normally-flat and soft metal washer 22ᵇ which cooperates with a sharp edge portion of the bushing 23 to effect a tight seal between the spreader and such bushing which is not only water tight but may be readily broken for quick and ready removal of the spreader unit.

To apply the hotter gases from the burner 15 directly to and become mixed with cooler gases at the remote points above the spreader, along the bottom of the tank bottom and in the flue 16, I provide a plurality of hollow ribs or flues 24 which are cast integral with and extend vertically through the spreader walls on the opposite sides of the hollow ribs 19, and which also pass through the spreader chamber adjacent its central portion. These flue walls may be straight or flared as desired without departing from my invention. As indicated generally, and diagrammatically in Fig. 1, it is obvious that some of the gases from the burner 15 will strike the bottom of the spreader and lick upwardly around its bottom walls and around its top walls and up against the bottom of the tank, and some of such gases will also pass directly through the vertical flues 24 and into the environment immediately above the spreader, along the tank bottom and into the flue 16. These flue-directed hot gases mingle with the gases which tend to become cooler and maintain the same as hot, active and effective gases, and also prevent the formation of insulating films of cold, dead and inactive gases, thereby rendering all gases of combustion fully effective.

In fact, practical demonstration has conclusively shown that these spreader flues render the burner gases substantially 100% effective and reduce the fuel consumption and cost of operation to a highly appreciable extent.

It is believed that the operation of the heater as a whole will be readily understood from the foregoing, and it may be stated generally as follows: With the burner 15 in operation, applying a flame upwardly against the bottom of the spreader, the water in contact with the spreader bottom is immediately heated and tends to rise towards the circulating pipe 25, and this action is followed by an incoming flow of cold water from the bottom of the tank through the hollow spreader neck 22, cold water passages 20 and openings 21 into the spreader chamber 18. The parts are so arranged that small concentrated streams of cooler water are spread over the lower wall of the chamber 18 which absorbs heat to a high temperature. This incoming water becomes heated to the point where it starts to rise and, as it rises, the foregoing action takes place again and is repeated continuously as long as the heater is in operation. The cold water intake passages are sufficiently few in number and are sufficiently small that the incoming streams enter at such a velocity that the water passes far enough beyond the point of termination of the cold water passages before enough heat has been absorbed to stimulate rising, with the result that as the water starts to rise, it is well under the curved upper wall of the spreader chamber 18 and is positively directed upwardly toward the riser pipe 25 insuring a continuity of circulatory action. The flues 24 in passing through the spreader chamber 18 near its central portion causes a further and quicker heating effect which still further stimulates the circulating action at that point in a manner which will be well understood.

Actual demonstration has shown that with my invention, the spreader absorbs more heat per B. t. u.'s fired than is the case with previous forms of spreaders. This added efficiency, comparatively speaking, may be readily converted into (a) increased circulation, or increased volume of water induced through the spreader without raising the temperature of the water; or (b) increased temperature rise by maintaining the flow volume constant. These are highly desirable features because in the use of non-automatic heaters it is advisable to have the higher temperature rise to accommodate the user who expects hot water without delay after lighting the burner. Consequently the water must be heated to the desired temperature in one passage of the same through the spreader. The provision for increased temperature rise makes this possible.

In automatic heaters the water in the storage tank is maintained at the desired temperature at all times and the reserve is sufficient to supply the demands of the user until the burner can more slowly replace that used. This condition is taken care of by converting the increased efficiency of my spreader into increased circulation or increased volume flow through the spreader.

An additional advantage of my invention in automatic heaters is that on the second "turn over" of the water the increased circulation or increased volume of water induced through the spreader may serve to hold the water below a temperature point at which it would deposit all lime in the spreader.

The flues also improve combustion conditions. I have found that in the use of previous spreaders the burner must be spaced farther from the spreader, than is necessary with my invention, to insure complete combustion and prevent the formation of carbon monoxide. The spreader flues are an important factor in this respect in that they insure that the gases of combustion move away from the space beneath the spreader more rapidly than formerly, due to the obvious flue action, thereby preventing the accumulation of dead gases at that point. Thus, my invention insures complete combustion in the use of small combustion chambers; and, in fact, provides for the use of smaller combustion chambers, if desired, which reduces the cost.

It will be understood that while I have shown only one embodiment of my invention, it is susceptible of various changes in details and arrangement of parts without departing from the spirit and scope of my invention as defined by the claims which follow.

I claim:

1. A thermosiphonic fluid heating unit including a spreader formed of a single casting including opposite convex walls joined at their edges to form a water compartment, opposite hollow ribs upon said walls and in communication with said chamber, and heat conducting elements extending through said chamber at the side of said ribs and at the central part of said chamber functioning to accelerate the circulating action of the water at said points of the chamber.

2. A thermosiphonic water heating and circulating structure for water heaters which comprises a plurality of walls forming a water heating and circulating chamber, one of which walls is adapted to be subjected directly to heated gases, cold water inlet means at the periphery of said chamber for discharging a concentrated stream of water into said chamber at such a relatively high velocity that said stream passes along said heated wall and to a point near the mid-part of said chamber before it receives substantial circulatory stimulation from said heated gases, and means passing through said chamber situated near the mid portion of the chamber and remote from the cold water inlet means for supplying heat for co-acting with part of the heated gases applied to said heated water for further heating the water in said chamber and for accelerating the thermosiphonic circulation thereof without substantially impeding the velocity of the incoming cold water through said inlet means.

3. A thermosiphonic fluid heating unit including a spreader for water heaters which comprises convex top and bottom walls forming a water chamber the bottom of said walls being adapted for the application of hot gases directly thereto, cold water conduit means discharging into said chamber at the periphery of the latter adjacent the juncture of said walls, said means including restricted intakes adapted to discharge thin concentrated streams of water spreadingly downward along the bottom of said walls at such velocity that sufficient heat has not been absorbed through said bottom wall to cause substantial circulatory action before said stream reaches approximately the mid-portion of said bottom wall, a heated water riser conduit carried by the mid-portion of said top wall, and vertical spaced flue-ways carried by approximately the mid-portions of said walls and remote from the water intakes and adapted to receive part of the hot gases applied to said bottom wall for accelerating the circulatory action of the water in said chamber in a path vertically along the mid portion of the latter.

4. A thermosiphonic fluid heating unit having oppositely concaved heat transmitting walls united at their peripheries and spaced at all other points to provide a fluid heating chamber therebetween, one of said walls being provided with cold water intake means extending transversely of the chamber and leading to a point adjacent said peripheral junction to provide a clearance passageway for fluid in said chamber, an exit passageway leading from said chamber through said wall, and a plurality of flues associated with said chamber at points remote from the said cold water intake means adapted to receive heating gases to thereby furnish additional heat for the water at the points of location thereof to accelerate the thermosiphonic circulation thereof through said spreader.

5. A thermosiphonic fluid heating unit comprising a chamber bounded by two oppositely concaved heat transmitting walls, cold water intake means radiating from a point above said chamber and communicating at their outer ends with said chamber at points adjacent the junction of said walls, an outlet passageway for said chamber leading through the top thereof and supplemental heat conducting means associated with said chamber at points remote from the said cold water intake means adapted to accelerate the thermosiphonic circulatory movement of the water passing through said spreader.

In testimony whereof, I have subscribed my name.

JAMES P. MORLEY.